No. 712,564. Patented Nov. 4, 1902.
C. W. MICHAEL.
CORN PLANTER.
(Application filed Apr. 7, 1902.)

(No Model.) 3 Sheets—Sheet 1.

Witnesses.
Inventor.

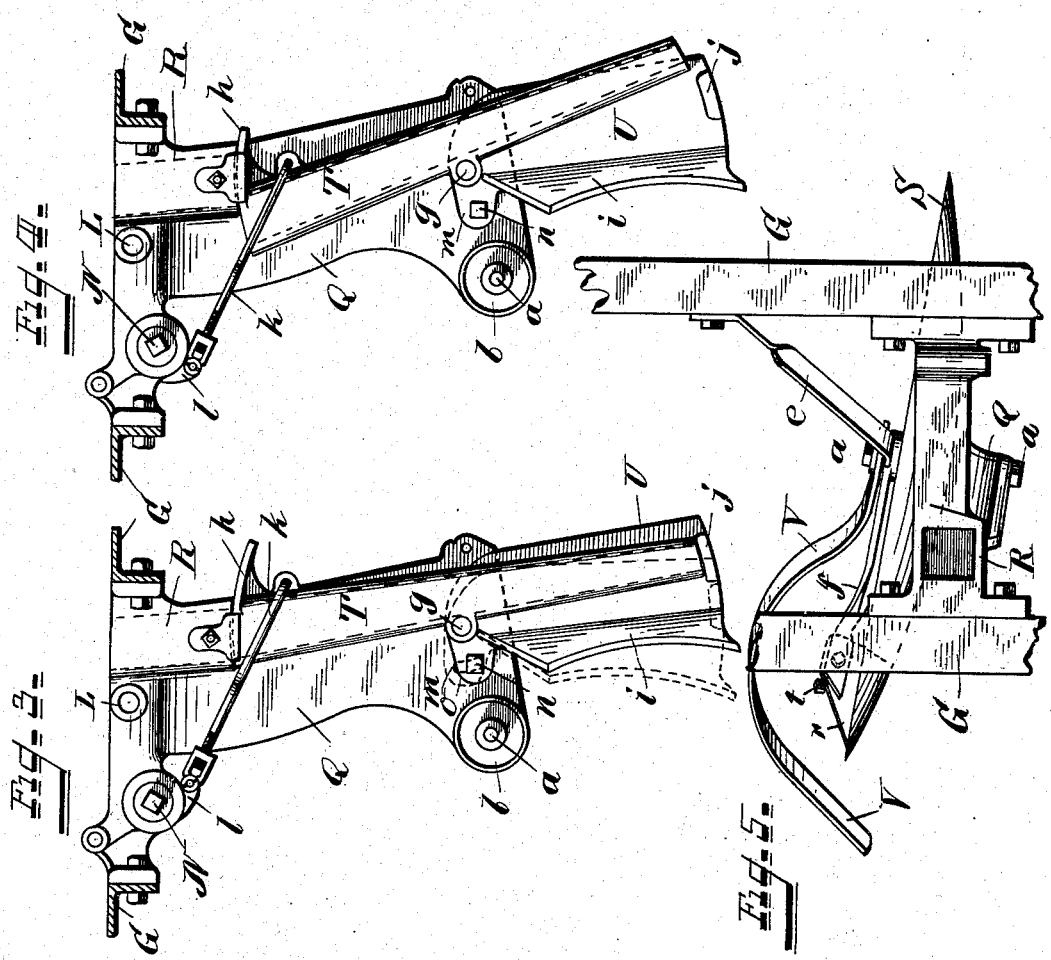

No. 712,564. Patented Nov. 4, 1902.
C. W. MICHAEL
CORN PLANTER.
(Application filed Apr. 7, 1902.)
(No Model.) 3 Sheets—Sheet 3.
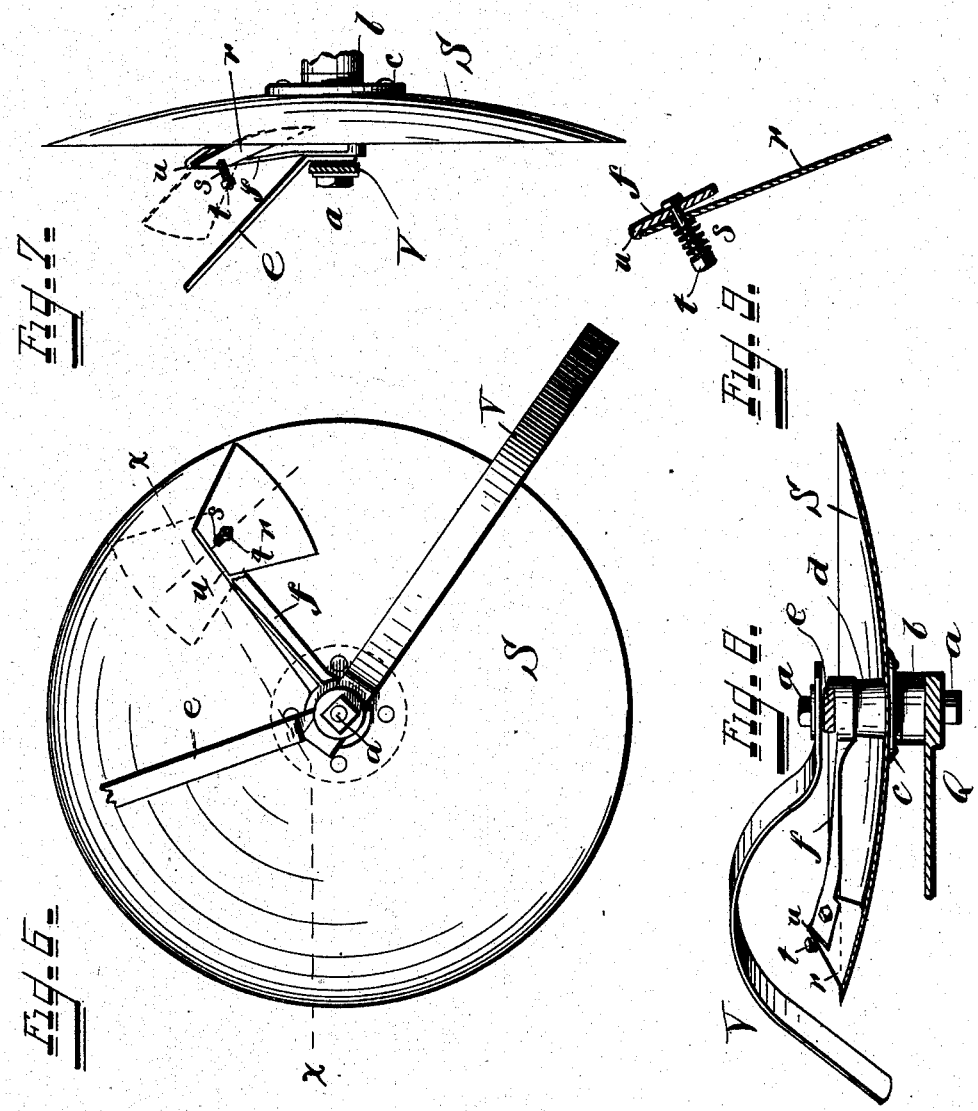
Witnesses.
Inventor.

UNITED STATES PATENT OFFICE.

CLEMENT W. MICHAEL, OF DAYTON, OHIO, ASSIGNOR TO THE STODDARD MANUFACTURING COMPANY, OF DAYTON, OHIO, A CORPORATION OF OHIO.

CORN-PLANTER.

SPECIFICATION forming part of Letters Patent No. 712,564, dated November 4, 1902.

Application filed April 7, 1902. Serial No. 101,792. (No model.)

*To all whom it may concern:*

Be it known that I, CLEMENT W. MICHAEL, a citizen of the United States, residing at Dayton, in the county of Montgomery and State of Ohio, have invented certain new and useful Improvements in Corn-Planters, of which the following is a full, clear, and exact description, reference being had to the accompanying drawings, forming part of this specification.

My invention relates to that class of corn-planters which employ revolving disks as the furrow-openers, said disks being suitably journaled to a forward frame corresponding to the ordinary runner-frame in this class of corn-planters and which forward frame is hinged or suitably jointed to the rear or main wheel-frame, which carries the driver's seat, the rotary drilling mechanism, operated by the traction of the machine, and lever mechanism for raising and lowering the front frame, with its seeding and furrow-opening mechanism, and also for regulating the depth of penetration of the furrow-openers; and it has for its object, first, the application to the forward frame of novel disk mechanism; second, the combination with said disk mechanism of novel seed delivering and depositing mechanism; third, the application to the disk mechanism of novel furrow-covering mechanism; fourth, the application to the disks of novel scraper mechanism, and, fifth, the combination and arrangement of the parts whereby the machine may be actuated by check-row mechanism or by throwing such check-row mechanism out of gear it may be actuated to drill the corn, all as will be hereinafter more fully set forth and the novelty be specifically pointed out in the claims.

Figure 1:
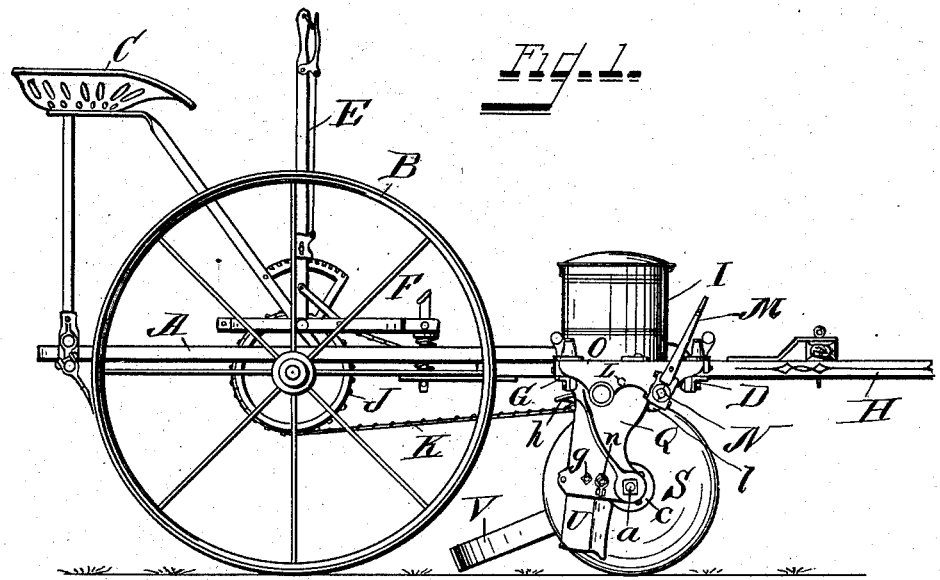
Figure 2:
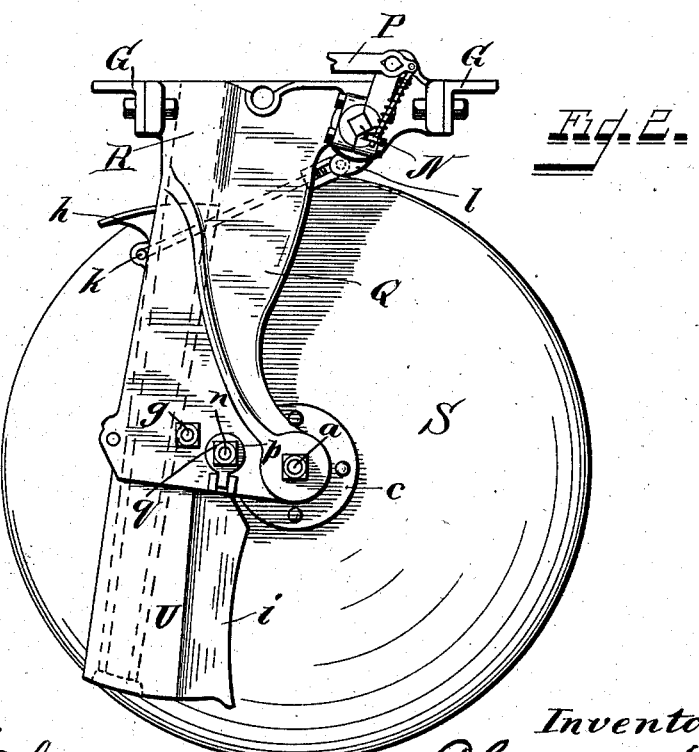

In the accompanying drawings, Figure 1, Sheet 1, is a side elevation of a corn-planter embodying my invention. Fig. 2, Sheet 1, is an enlarged side elevation of the disk and dropping mechanism. Fig. 3, Sheet 2, is an enlarged inside elevation of the dropping mechanism in one position. Fig. 4, Sheet 2, is a corresponding view in another position of the parts. Fig. 5, Sheet 2, is a plan view of the entire disk mechanism. Fig. 6, Sheet 3, is an enlarged inside view of the disk, showing the scraper mechanism and furrow-closer. Fig. 7, Sheet 3, is an end elevation of Fig. 6 looking from the left, with the furrow-closer omitted. Fig. 8, Sheet 3, is a sectional plan view, reversed, on the dotted line $xx$ of Fig. 6. Fig. 9, Sheet 3, is a sectional detail of the scraper mechanism.

The same letters of reference are used to indicate identical parts in all the figures.

In Fig. 1, which represents the corn-planter in side elevation and with all of its parts assembled, the main frame is represented by A, the carrying-wheels therefor by B, and the driver's seat, carried on the main frame, by C. The main frame is hinged in the usual or any suitable manner to the forward or runner frame D, and E is the usual or any suitable hand lock-lever, supplemented by a foot-lever F for raising and depressing the forward frame. The forward frame is composed, essentially, of two transverse angle-bars G, to which the tongue or pole H is secured. Supported upon each end of the forward frame is the usual hopper or seedbox I, containing in its bottom the usual or any suitable rotary dropping-plates, (not shown,) but which are driven continuously for drilling by a sprocket-wheel J, rotated by the traction of the machine and connected by a drive-chain K with a smaller sprocket-wheel (not shown) on a shaft journaled in the forward frame between the bars G and whose position is indicated at L. This shaft has the usual or any suitable gearing communicating with the feed dropping-plates in the boxes I, so as to continuously rotate the same when the planter is to be used for drilling, but which mechanism can be thrown out of gear at any time when it is desired to rotate the feed-plates intermittingly by the usual or any suitable check-row arms M, pivoted on a shaft N, journaled in check-row heads O, secured to the outer ends of the bars G, and which check-row arms actuate spring-dogs P, which engage the feed-plates and which are carried on short crank-arms secured to the shaft N.

All of the foregoing mechanism is well known to the art and may be of any suitable construction and needs no further description here.

I will now proceed to describe the first feature of my invention, which consists in the disk furrow-openers and the seed-dropping mechanism connected therewith, reference being had especially to Figs. 2, 3, and 4. Adjustably bolted between the bars G G directly beneath the hopper I, on each side, is a boot or pendent casting Q, having a short spout or channel R, indicated by dotted lines, (see Fig. 2,) whose upper end registers with the discharge-opening from the hopper I. At the forward lower extremity of this boot is journaled the furrow-opening disk S, which is a concavo-convex disk, such as is used in disk harrows and disk drills, and which is set at an angle oblique to the line of draft, with its concave side inward and with its convex side at its lower front edge in line with the draft of the machine and the furrow to be opened, as seen in Fig. 5. This disk is journaled on a spindle $a$, extending through the boot, with a collar $b$, Fig. 8, made cup-shaped to receive a short hub projecting from a flange $c$, riveted to the disk, and which collar is interposed between the boot and the disk, as shown. On the concave side of the disk the hub $d$ likewise projects and receives between it and a brace-arm $e$, embracing the inner end of the spindle, a scraper-arm $f$, to be referred to hereinafter. The upper end of the brace-arm $e$, as seen in Fig. 5, is bolted to the forward bar G of the front frame.

The boot extends down to about the middle of the disk S and is set sufficiently far away from its convex side to admit between it and the disk a pivoted spout T, Figs. 3 and 4, which is pivoted, as at $g$, to the boot and whose upper open end in one position registers with the channel R in the upper end of the boot, as seen in Fig. 3. Projecting rearwardly from the upper end of this spout is a cut-off plate $h$, which, when the spout is vibrated forward to the position shown in Fig. 4 covers and closes the lower end of the channel R. Likewise pivoted to the boot Q by the same pivot or upon the same axis that the spout T is pivoted is a moldboard-plate U, having an inturned forward portion $i$ inclined forward and with its edge curved to adhere closely to the convex side of the disk, as seen in Figs. 1 and 2. The rear side of this moldboard-plate is a continuation downward of the boot and receives between it and the disk the lower end of the spout T, which in the position of the parts shown in Fig. 3 rests upon a projecting shelf or cut-off plate $j$, projecting from the inner side of the moldboard and which closes the lower end of the spout.

The spout is given a vibratory motion from the check-row shaft by means of a link $k$, pivoted thereto near its upper end, and which link at its forward end is pivoted to a short crank-arm $l$, projecting from the check-row shaft N. In Fig. 3 the position of the parts is shown when the check-row arm M is in its forward position, Fig. 1, and in Fig. 4 the position of the parts is shown when the spout is vibrated by the vibration of the check-row arm under the action of the check-row wire to free the lower end of the spout from the shelf $j$ and deposit the corn in the furrow. In this latter position of the parts it will be observed that the cut-off plate $h$ has closed the lower end of the channel R, so that any grains dropping accidentally may be arrested thereby until the spout has been vibrated back to the position of Fig. 3, when they will drop through the spout and rest upon the shelf $j$ instead of going to the ground to be deposited between the hills. In this way perfect accuracy of planting is secured without the danger of corn being deposited in a furrow between the hills.

To use the machine for drilling, the check-row mechanism is thrown out of action and the moldboard is thrown forward enough, as indicated by the dotted lines in Fig. 3, to take the shelf $j$ from under the lower end of the spout when the latter registers constantly with the channel R, and as a convenient means of affecting this adjustment of the moldboard I have provided it with a bell-crank extension $m$, through which a bolt $n$ is passed, which bolt extends through a slot $o$ in the boot and has a guided washer $p$ on its outer end, Fig. 2, and a clamping-nut $q$, by which it may be tightened up to hold the moldboard in either of its adjusted positions, as will be readily understood. The purpose of the washer $p$ is to cover the slot and prevent dirt from getting therein.

The next feature of my invention relates to the scraper mechanism, in which, as before described, $r$ is the scraper-arm. This arm projects rearwardly and upwardly and has upon its end a scraper-blade $r$, pivoted thereto and held in contact therewith by means of a spring $s$, Fig. 9, on the bolt $t$, which unites the scraper-blade to the arm. Guide-ribs $u$, Fig. 6, determine the position of the scraper when it is turned down and in contact with the disk, and when it is desired to throw the scraper out of action it is only necessary to draw it out from the arm $f$ and then turn it around and upward to the position shown by the dotted lines in Figs. 6 and 7, whereupon it will be held away from the disk by means of the ribs $u$. In this simple way the scraper may be brought into or thrown out of action at will.

The remaining feature of my invention consists in the provision of a loosely-hung curved covering-blade V, Figs. 5, 6, and 8, which is loosely pivoted upon the inner end of the spindle $a$ and whose rear ends trailing over the furrow made by the disk draw the earth into the same to cover the deposited corn, and the furrow is finally pressed down by the wheels B, as is customary in corn-planters of this class.

Having thus fully described my invention, I claim—

1. In a corn-planter, the combination of a furrow-opening disk, seeding mechanism above the same, a boot upon the convex side of said disk, a moldboard at the lower end of said boot, a vibratory seed-delivering spout between said disk, boot and moldboard, and mechanism actuated by the forward travel of the machine to vibrate said spout intermittingly.

2. In a corn-planter, the combination of a furrow-opening disk, seeding mechanism above the same, a boot upon the convex side of said disk, a moldboard at the lower end of said boot, a vibratory seed-delivering spout between said disk, boot and moldboard, and check-row mechanism connected to said spout to vibrate the same intermittingly.

3. In a corn-planter, the combination of a furrow-opening disk, seeding mechanism above the same, a boot upon the convex side of said disk, a moldboard at the lower end of said boot, a vibratory seed-delivering spout between said disk, boot and moldboard, a shelf projecting from the moldboard to normally close the lower end of said spout, and mechanism actuated by the forward travel of the machine to vibrate said spout intermittingly and uncover its lower discharging end.

4. In a corn-planter, the combination of a furrow-opening disk, seeding mechanism above the same, a boot upon the convex side of said disk, a moldboard adjustable upon the lower end of said boot, a vibratory seed-delivering spout between said disk, boot and moldboard, a shelf projecting from the moldboard to normally close the lower end of said spout, and mechanism actuated by the forward travel of the machine to vibrate said spout intermittingly and uncover its lower discharging end.

5. In a corn-planter, the combination of a furrow-opening disk, seeding mechanism above the same, a boot upon the convex side of said disk, an adjustable moldboard at the lower end of said boot, a seed-delivering spout between said disk, boot and moldboard, and a shelf projecting from said moldboard to normally close the lower end of said spout under one adjustment of the moldboard and to uncover the same under another adjustment of the moldboard.

6. In a corn-planter, the combination of a seed-hopper I with seed-delivering mechanism therein, a boot Q secured beneath said hopper and having a channel communicating with the seed-discharge opening in said hopper, a furrow-opening disk journaled to said boot, a moldboard U projecting from the lower end of said boot and provided with a shelf $j$ at its lower end, a spout T pivoted to the boot between the same, the moldboard and the disk and having its upper end adapted to register with the channel in the boot and its lower end to be closed by said shelf, and mechanism actuated by the forward travel of the machine to vibrate said spout intermittingly, substantially as described.

7. In a corn-planter of the character described, the combination of the boot Q provided with channel R, the furrow-opening disk S journaled to said boot, the seed-delivering spout T pivoted as at $g$ to said boot and having a cut-off plate $h$ at its upper end which registers with the channel R, and the moldboard U adjustably pivoted to the boot and having at its lower end a shelf $j$ adapted to be thrown into or out of engagement with the lower end of said spout, substantially as and for the purpose specified.

8. In a corn-planter of the character described, the combination with the concavo-convex furrow-opening disk, of a covering-blade pivoted upon the concave side of said disk extending to the rear thereof and adapted to draw the earth into the furrow made by said disk.

9. In a corn-planter of the character described, the combination with the disk S and its spindle, of a pivoted covering-blade hung upon said spindle and adapted to draw the earth into the furrow made by said disk, substantially as described.

CLEMENT W. MICHAEL.

Witnesses:
JOHN F. CAMPBELL,
F. W. BENTZ.